(12) United States Patent
Lu et al.

(10) Patent No.: US 10,499,574 B2
(45) Date of Patent: Dec. 10, 2019

(54) HYDROPONIC PLANT GROW CABINET

(71) Applicant: Natufia Labs OÜ, Tallinn (EE)

(72) Inventors: Gregory Francis Chakwan Lu, Püünsi küla (EE); Lauri Kapp, Tallinn (EE)

(73) Assignee: NATUFIA LABS OÜ, Tallinn (EE)

( * ) Notice: Subject to any disclaimer, the term of this patent is extended or adjusted under 35 U.S.C. 154(b) by 194 days.

(21) Appl. No.: 15/597,406

(22) Filed: May 17, 2017

(65) Prior Publication Data
US 2017/0347547 A1    Dec. 7, 2017

(30) Foreign Application Priority Data
Jun. 3, 2016   (EE) .............................. 201600025 U

(51) Int. Cl.
| *A01G 31/02* | (2006.01) |
| *G08B 21/18* | (2006.01) |
| *A01G 9/24*  | (2006.01) |

(52) U.S. Cl.
CPC .............. *A01G 31/02* (2013.01); *G08B 21/18* (2013.01); *A01G 9/24* (2013.01); *Y02A 40/264* (2018.01); *Y02P 60/216* (2015.11)

(58) Field of Classification Search
USPC .......... 47/61, 60, 59 R, 62 R, 63, 83, 82, 17
See application file for complete search history.

(56) References Cited

U.S. PATENT DOCUMENTS

| 2,928,211 | A  | * | 3/1960  | Martin ................... A01G 31/06 47/60 |
| 3,458,951 | A  | * | 8/1969  | Martin ................... A01G 31/06 239/524 |
| 5,283,974 | A  |   | 2/1994  | Graf |
| 5,315,834 | A  | * | 5/1994  | Garunts ................... A61L 9/00 62/78 |
| 8,910,419 | B1 | * | 12/2014 | Oberst ................... A01G 31/06 47/60 |
| 9,936,650 | B2 | * | 4/2018  | Palmieri, Jr. ............ A01G 9/24 |
| 2003/0101645 | A1 | * | 6/2003 | Cole ....................... A01G 31/02 47/61 |
| 2003/0150394 | A1 | * | 8/2003 | Wolfe .................... A01K 63/003 119/246 |

(Continued)

FOREIGN PATENT DOCUMENTS

| CN | 202232346 U | 5/2012 |
| CN | 103270907 A | 9/2013 |

(Continued)

OTHER PUBLICATIONS

CN103270907 A _ Machine English Abstract.

(Continued)

*Primary Examiner* — Andrea M Valenti
(74) *Attorney, Agent, or Firm* — Ladas & Parry LLP

(57) ABSTRACT

A hydroponic plant grow cabinet including a housing. The housing has a main plant growing chamber and a pre-growing chamber for seeds/seedlings, main tank and auxiliary tanks for a nutrient solution and pH level regulating solutions, pumps and tubing, a light source, a ventilator, a controller, sensors, a display, a loudspeaker, a user input, a network communication device, a connection to an electric main, and connections to water mains and sewage.

5 Claims, 3 Drawing Sheets

(56) References Cited

U.S. PATENT DOCUMENTS

| | | | | |
|---|---|---|---|---|
| 2003/0178373 A1* | 9/2003 | Kondo | ................ | A01G 31/00 |
| | | | | 210/748.01 |
| 2016/0128289 A1* | 5/2016 | Wong | ................ | A01G 31/02 |
| | | | | 47/62 A |
| 2016/0212954 A1* | 7/2016 | Argento | ................ | A01G 31/06 |
| 2016/0316646 A1* | 11/2016 | Lepp | ................ | A01G 7/045 |
| 2017/0013810 A1* | 1/2017 | Grabell | ................ | A01G 31/06 |
| 2017/0099791 A1* | 4/2017 | Joseph | ................ | A01G 31/04 |
| 2017/0223912 A1* | 8/2017 | Gagne | ................ | A01G 25/16 |
| 2017/0265408 A1* | 9/2017 | McGowan | ................ | A01G 22/00 |
| 2018/0042186 A1* | 2/2018 | Kop | ................ | A01G 9/20 |
| 2018/0184602 A1* | 7/2018 | Ofir | ................ | A01G 9/20 |
| 2019/0075741 A1* | 3/2019 | Olesen | ................ | A01G 31/02 |

FOREIGN PATENT DOCUMENTS

| | | | | |
|---|---|---|---|---|
| JP | H01112928 A | 5/1989 | | |
| WO | WO 2012/045903 A1 * | 4/2012 | ................ | A01G 9/14 |

OTHER PUBLICATIONS

JPH01112928 A—Machine English Translation of application including Abstract.

202232346 U _ Machine English Abstract.

Urban Cultivator Haus ist ein Mini-Hydrokultur-System für Ihre Küche, Apr. 15, 2014 http://freewill.typepad.com/freie-wille/2014/04/urban-cultivator-haus-ist-ein-mini-hydrokultur-system-fr-ihre-kche.html.

* cited by examiner

HYDROPONIC PLANT GROW CABINET

TECHNICAL FIELD

Present invention relates to a hydroponic plant grow cabinet. More precisely present invention relates to a home or professional appliance for growing edible plants using fully automated hydroponic technology.

BACKGROUND ART

In patent U.S. Pat. No. 5,283,974A (published Aug. 2, 1994) is known a portable grow cabinet, comprising control means for controlling various environmental functions, such as plant watering, temperature, humidity, air circulation and lighting. However said existing cabinet offers very limited automation and requires regular maintenance (for example frequent refilling) and frequent monitoring by the user.

DISCLOSURE OF INVENTION

The aim of the present invention is to provide an easy and simple to use fully automated apparatus to grow plants hydroponically in a limited place. Said cabinet is intended for a non-professional growers, i.e. to the end users, as restaurants, offices or private homes.

The aim of the present invention is also to provide fully automated grow cabinet requiring minimum amount of an attention and maintenance from the end user.

The aim of the present invention is also to provide fully automated grow cabinet which simply requires to be plugged into the electric socket, to the water mains and sewage similarly to an ordinary washing machine.

Present invention provides a hydroponic plant grow cabinet, comprising a housing, said housing comprising main plant growing chamber and a pre-growing chamber for seed/seedlings, main tank and auxiliary tanks for a nutrient solution and pH level regulating solutions, pumps and tubing, lighting means, ventilating means, control means, sensors, display means, loudspeaker and user input means, network communication means and connection to electric main.

Also said cabinet comprises connections to water mains and sewage, inside said housing cabinet comprises:

a module of a refill cartridge system for cartridges with nutrients and chemicals for regulating pH level;

in the main chamber at least one module of plant growing pod stands, said module being slidable in and out of the chamber, where each stand comprises in vertical direction multitude of plant grow pods one above the other; and in the pre-growing chamber at least one holder module for receiving several seed/seedling growing cups, said cup holder module being slidable in and out of the chamber.

Preferably the nutrient solution is fed from the main tank to said plant growing pod stands at the top of the main chamber into the top most growing pod, where in the bottom of each growing pod is an aperture.

The bottom aperture of the pod above opens into the pod below such that nutrient solution fed into the top most pod is fed through bottom apertures of pods from pods above to pods below. The nutrient solution exiting from the lower most pod is collected to a collecting pan to be fed further into the pre-growing chamber.

Preferably the nutrient solution fed into the pre-growing chamber is collected onto a solution pan below the holder module for receiving several seed/seedling growing cups, where level of the solution in a solution pan is kept such that at least the bottom part of each seed/seedling growing cup is immersed into the solution and the excess solution is fed into the main tank.

Preferably the concentration of nutrients in the nutrient solution in the main tank is replenished from the auxiliary tank for a nutrient solution and water from the water main.

Preferably the pH level of solution in the main tank is regulated by the chemicals from the auxiliary tanks for chemicals for regulating pH level.

Preferably the module of a refill cartridge system for cartridges with nutrients and chemicals for regulating pH level comprises three cartridges, one cartridge for nutrients for growing plant, one cartridge for chemical for regulating pH level down and one cartridge for chemical for regulating pH level up.

Preferably the control means are set to send through network communication means status and alarm messages to user's communication device, such as smart phone, computer, laptop or tablet.

For sanitation and to avoid a bacteria growth in the solution, the main tank 4 may also comprise UV-light.

Connections to the water mains and sewage may be permanent or temporary. When temporary connections to a water mains and sewage are used, said connections are made only when needed for refilling cabinet with fresh water and/or for draining the main tank. The need for such connections to be made is communicated to the user for example by displaying a corresponding message on display means and/or said message is sent to the user through communication means.

Preferably the grow cabinet according to the invention have dimensions corresponding to standard kitchen appliances, such as refrigerator. This makes it easy to integrate grow cabinet of present invention easily to any existing kitchen.

BRIEF DESCRIPTION OF DRAWINGS

The present invention is now described in greater detail with references to the accompanying drawings, in which.

BEST MODE FOR CARRYING OUT THE INVENTION

Figure 1:
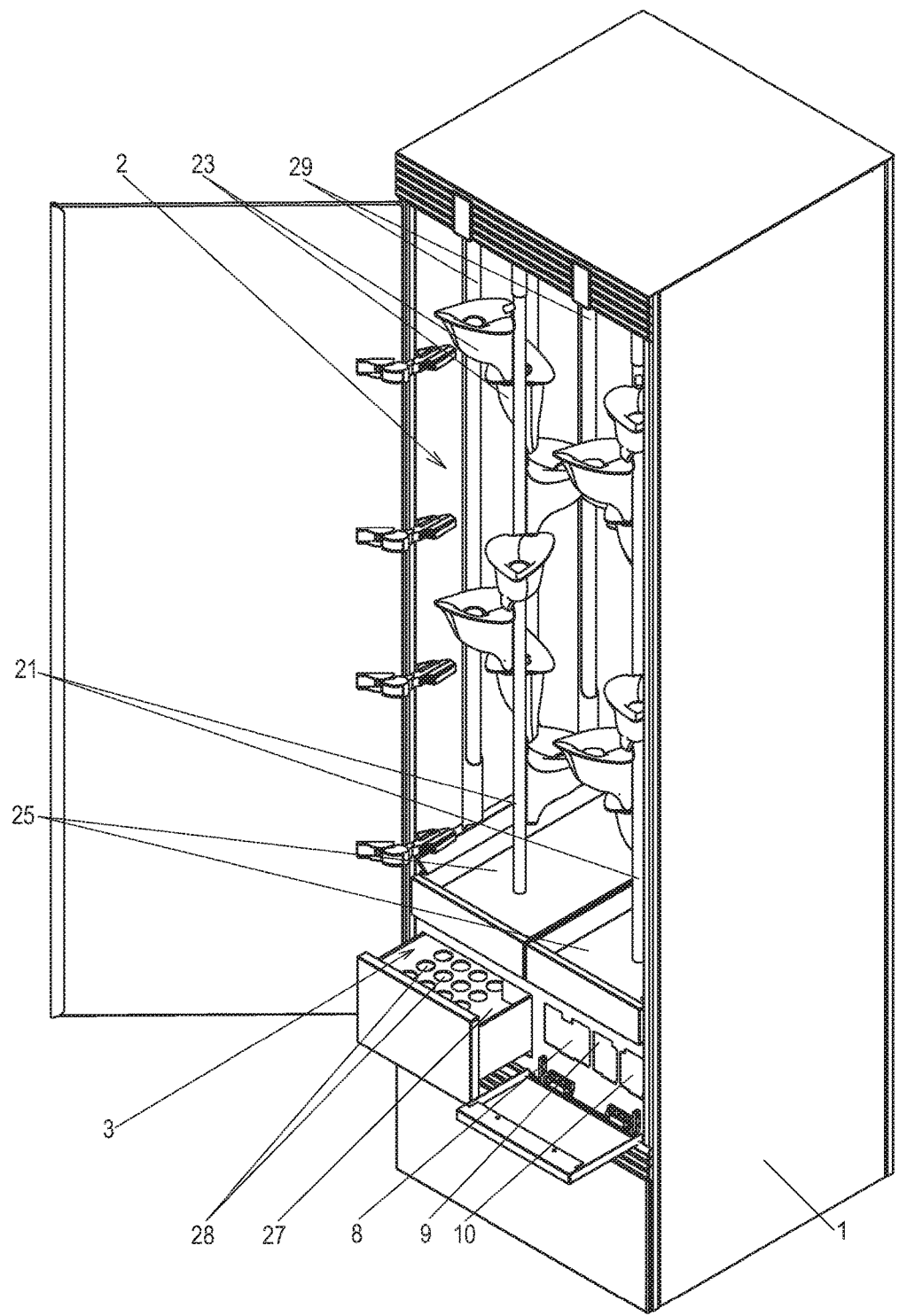
FIG. 1 represents a schematic perspective view of an embodiment of a grow cabinet according to the invention, where access door to main growing chamber and pre-growing chamber is opened and holder module with grow cups has been drawn out of the pre-growing chamber.
Figure 2:
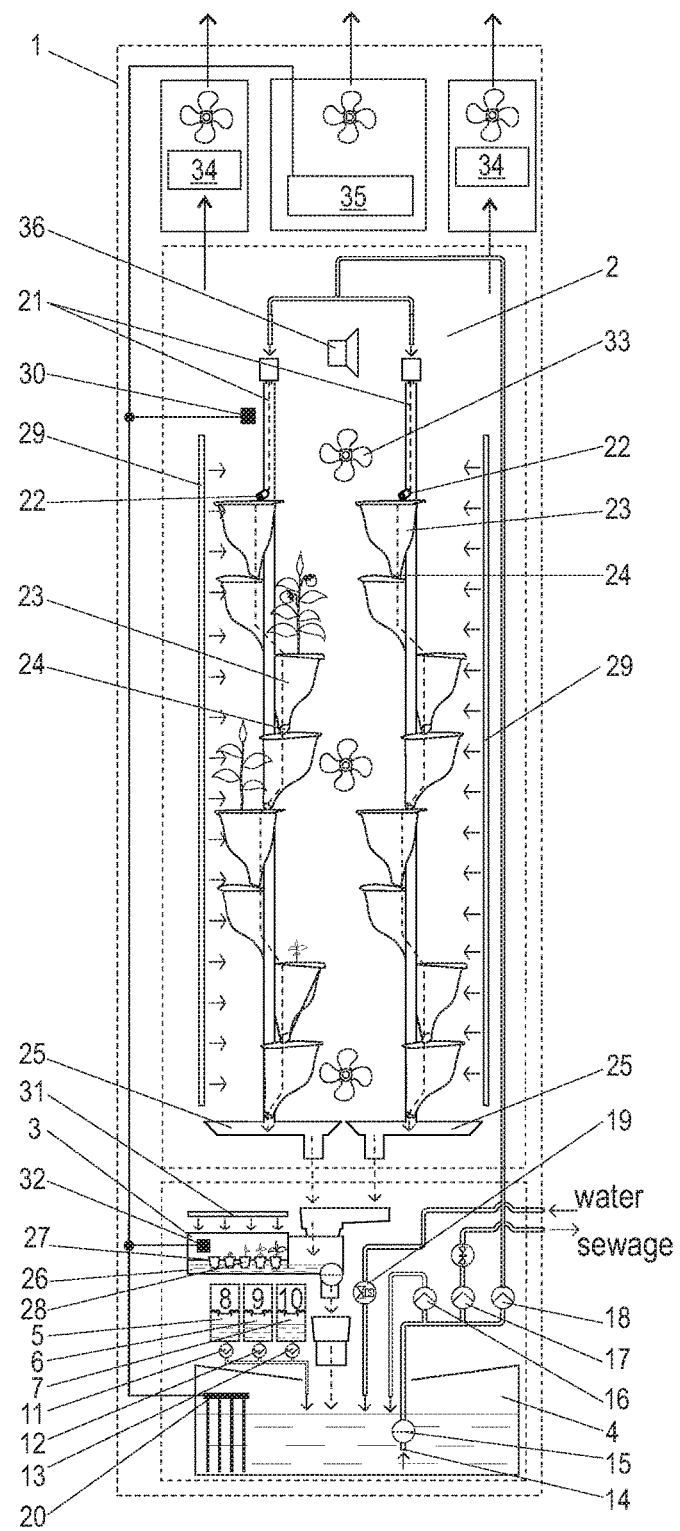
FIG. 2 represents a schematic diagram of a grow cabinet according to the invention showing only the main parts of the cabinet.
Figure 3:
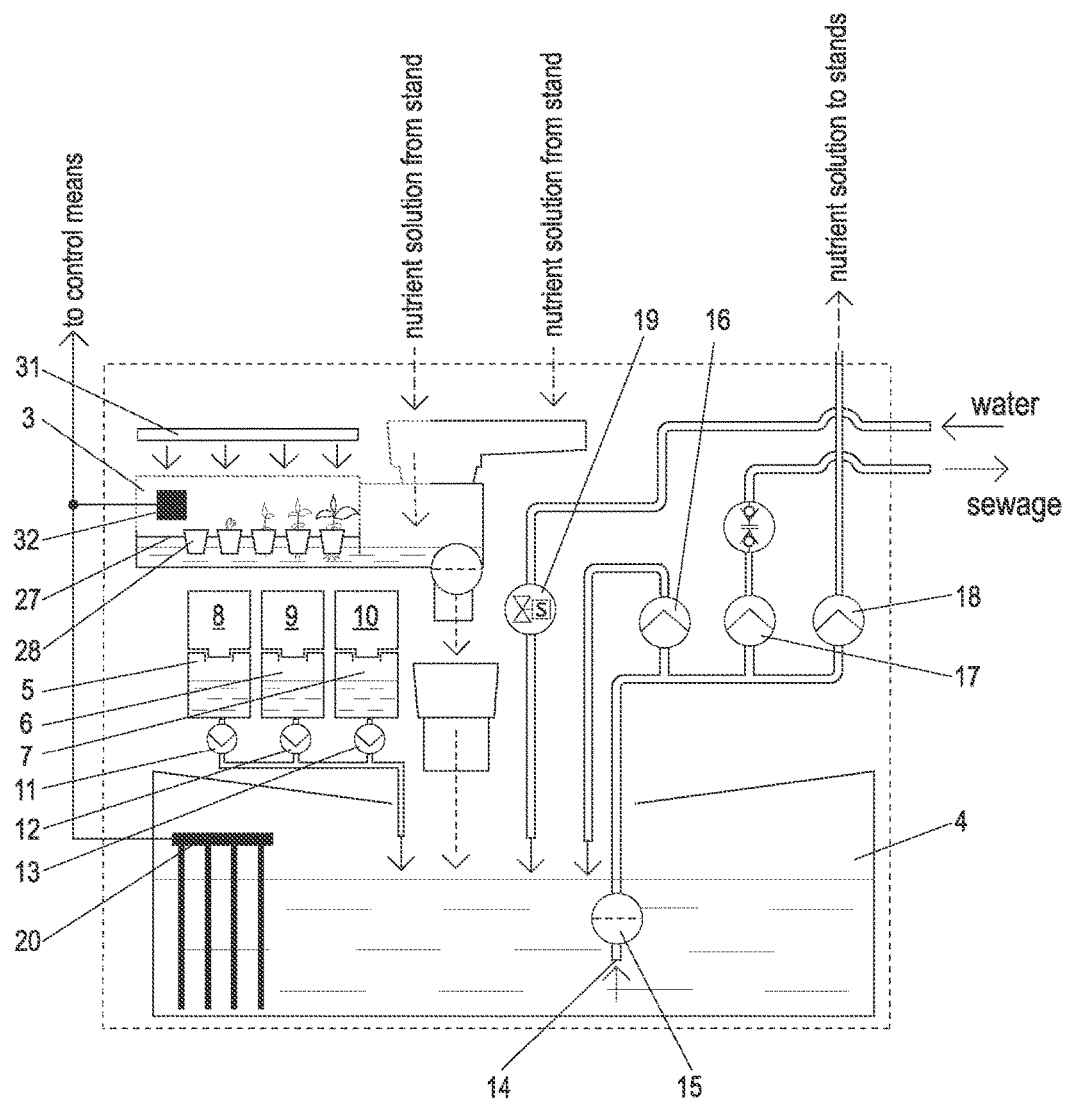
FIG. 3 represents a schematic diagram of a grow cabinet according to FIG. 2, showing only the lower part of the cabinet comprising pre-growing chamber, refill cartridge system and all the nutrient tanks and tubing connections.

In the schematic diagrams for the sake of clarity only essential units and devices of the grow cabinet are depicted, therefore a wiring of fans, pumps and valves are omitted from the diagram. Also a wiring of sensors is only depicted in general manner The liquid flow through the cabinet is depicted with dash lines ending with arrow heads.

The hydroponic plant grow cabinet according to present invention comprises a housing 1, said housing 1 comprising main plant growing chamber 2 and a pre-growing chamber 3 for seed/seedlings, main tank 4 and auxiliary tanks 5, 6 and 7.

The auxiliary tank 5 is for a nutrient solution, the auxiliary tank 6 is for a chemical for regulating pH level up and auxiliary tank 7 is for a chemical for regulating pH level down. On top of the tank 5 sits a refill cartridge 8, on top of the tank 6 sits a refill cartridge 9 and on top of tank 7 sits a refill cartridge 10.

A module of a refill cartridge system comprises refill cartridges 8, 9 and 10 and their corresponding auxiliary tanks 5, 6 and 7 for receiving their content.

Each corresponding auxiliary tank 5, 6, 7 is connected with a main tank 4 through corresponding pump 11, 12 and 13. This enables refill main tank 4 with fresh nutrient solution or chemicals for pH level regulating only when needed.

In the main tank 4 is a water intake 14 followed by a filter 15. After said filter 15 tube branches into three separate channels with their own corresponding pump 16, 17, 18.

Pump 16 is for the agitation of the liquid in the main tank 4. Pump 17 is for emptying main tank 4 into a sewage. Pump 18 is for the circulation of the nutrient solution inside of the cabinet through the grow chambers.

The main tank 4 also includes connection to the water mains through the solenoid valve 19.

In addition in the main tank 4 is a sensor set 20 for monitoring liquid level, pH level, temperature, etc.

Pump 18 feeds nutrient solution from the main tank 4 into a upper part of the main grow chamber 2. There the solution is fed into upper ends of each pod stand 21. Each pod stand 21 includes a spout 22 through which solution is fed into a upper most pod 23 on that stand 21.

At the bottom end of each pod 23 is an aperture 24, which opens above the pod 23 below it. In this way the nutrient solution makes its way from the upper most pod 23 through every other pod 23 on that stand 21 and via each aperture 24 at the bottom of each pod 23 to a bottom most pod 23. From the bottom most pod 23 nutrient solution is collected onto a collection pan 25. From the collection pan 25 the nutrient solution in turn is fed into a pre-growing chamber 3.

The module of plant growing pod stand comprises therefore pod stand 21, pods 23 and collection pan 25, which are slidable as an unit (module) in and out of the main chamber 2 (preferably with collection pan 25).

In the pre-growing chamber 3 said solution is collected onto a solution pan 28 below the holder module 27 for receiving several seed/seedling growing cups 28. Said cup holder module being slidable in and out of the pre-growing chamber 3.

The level of the solution in a solution pan 26 is kept such that each seed/seedling growing cup is immersed into the solution. Excess of the solution is fed back into the main tank 4.

Each pod 23 contains grow medium for the plant.

As can be seen from the FIG. 1, main chamber 2 comprises also a lighting devices 29 and environmental sensor 30 and at least one fan 33. In the pre-growing chamber 3 also includes above seed/seedling growing cups 28 a lighting device 31 and environmental sensor 32.

At the top of the housing 1 are air filters 34 and control means 35. All the sensors, pumps, fans and solenoid valves are connected to the control means 35.

The cabinet also comprises loudspeaker 36, which is also connected to the control means 35.

As can be seen from FIG. 1, different modules in the housing 1 can be accessed through access doors: a module of a refill cartridge system, the main chamber 4 and the pre-growing chamber 3. The pre-growing chamber 3 comprises a holder module 27 for receiving several seed/seedling growing cups 28 and said cup holder module 27 is slidable out of the pre-growing chamber 3.

As can be seen from the FIG. 1, each stand 21 comprises in vertical direction multitude of plant grow pods 23 one above the other.

For sanitation and to avoid a bacteria growth in the solution, the main tank 4 also comprises UV-light (not shown).

All sensors, display means (for example screen or touch screen—not shown), loudspeaker and user input means (for example keypad or touch screen—not shown), network communication means (not shown), connection to electric main (not shown), pumps, valves, lighting device, fans are connected to control means 35. Control means 35 are essentially microprocessor-controlled control electronics (i.e. computerized control system) comprising memory means for a control program of the cabinet, which is used to maintain suitable conditions in the chambers 2 and 3 in the cabinet for seeds/seedlings and plants to grow.

The control means are responsive to user input commands for controlling various environmental functions, such as plant watering, temperature, humidity, air circulation and lighting, etc. Preferably the ambient conditions within the cabinet are programmable separately for daytime and nighttime and also for seasonal cycles. The ambient temperature within the chambers can be maintained at a relatively constant level, or alternatively, a temperature differential can be maintained within chambers to accommodate various types of plants which thrive under different temperature conditions.

For example said control means 35 are also used to display on the display means information and status of the refill cartridges, information about conditions inside cabinet (temperature, humidity, lighting), etc. Through a network communication means alerts and information can be sent also to the user device (through WiFi, LAN connection, internet, mobile phone network, etc), such as smart phone, tablet, computer, etc.

The loudspeaker 36 is used to play alarms, messages and also to play music to plants.

The apparatus will automatically control & regulate the plants growth via light control (software, sensor), temperature control (ventilation, watering, sensor), humidity control (sensor, ventilation watering), watering control (software schedule & humidity), nutrient concentration level in the water (software schedule, pump, sensor), a water pH level (sensor, pump, software), a water level (sensor, pump, software), a music level (software), ventilation (fans & software).

The cabinet will also automatically inform the user when the refill cartridges of nutrients and pH level regulating chemicals need to be replaced, when a fault occurs in the cabinet, for example faulty sensor, pump, valve, power failure, water supply failure from the water mains, sewage blockage, etc.

FIG. 1 depicts only one possible embodiment of the cabinet out of many. FIG. 1 shows an embodiment which could be referred as closed cabinet with one or more access doors.

The cabinet according to invention can be implemented also without said door, i.e. as so called open cabinet.

For person skilled in the art it is obvious that the present invention is not limited to the embodiment depicted in the attached drawings and described above, but within the scope of attached claims many other embodiments are possible.

LIST OF REFERENCE NUMBERS

1—housing
2—main plant growing chamber

3—pre-growing chamber
4—main tank
5—auxiliary tank for a nutrient solution
6—auxiliary tank for a chemical for regulating pH level up
7—auxiliary tank for a chemical for regulating pH level down
8—cartridge for a nutrient solution
9—cartridge for a chemical for regulating pH level up
10—cartridge for a chemical for regulating pH level down
11—pump for an auxiliary tank for a nutrient solution
12—pump for an auxiliary tank for a chemical for regulating pH level up
13—pump for an auxiliary tank for a chemical for regulating pH level down
14—water intake
15—filter
16—pump
17—pump
18—pump
19—solenoid valve
20—sensor set
21—pod stand
22—spout
23—pod
24—aperture
25—collection pan
26—solution pan
27—holder module
28—growing cup
29—lighting device
30—environmental sensor
31—lighting device
32—environmental sensor
33—fan
34—air filter
35—control means
36—loudspeaker

The invention claimed is:

1. A hydroponic plant grow cabinet, comprising a housing, said housing comprising a main plant growing chamber and a pre-growing chamber for seeds/seedlings, a main tank and first, second and third auxiliary tanks, a plurality of pumps and tubing, a light source, a ventilator, a controller, a plurality of sensors, a display, a loudspeaker, a user input, a network communication device, and a connector for connection to an electric main,
wherein the main chamber comprises at least one module comprising a plurality of plant growing pod stands, said module being slidable in and out of the main chamber, where each of the plurality of plant growing pod stands comprises in vertical direction a plurality of plant grow pods one above the other, wherein the pre-growing chamber comprises at least one cup holder module configured for receiving a plurality of seed/seedling growing cups, said cup holder module being slidable in and out of the chamber, wherein said cabinet comprises means for connecting to a water main and sewage such that water in the main tank can be replenished from the water main and waste in the main tank can be emptied to the sewage, wherein said cabinet comprises a cartridge module configured for receiving a plurality of refill cartridges, including first, second and third refill cartridges for dispensing nutrient solution and chemicals for regulating pH level, the cartridge module being disposed with respect to the plurality of auxiliary tanks such that the first, second and third refill cartridges, when received in the module, are adjacent to an opening in the first, second and third auxiliary tanks respectively so that the nutrients and chemicals dispensed from the first, second and third cartridges are received in the first, second and third auxiliary tanks respectively, wherein the first, second and third auxiliary tanks are operatively connected to the main tank through the plurality of pumps such that the nutrients and chemicals dispensed from the first, second and third cartridges and received in the first, second and third auxiliary tanks can be pumped to the main tank for replenishing nutrients and regulating pH level of the nutrient solution in the main tank.

2. The hydroponic plant grow cabinet according to claim 1, characterized in that the nutrient solution is fed from the main tank to said plant growing pod stands at the top of the main chamber into the top most growing pod, where in the bottom of each growing pod is an aperture, where the bottom aperture of the pod above opens into the pod below such that the nutrient solution fed into the top most pod is fed through bottom apertures of pods from pods above to pods below, and where the nutrient solution exiting from the lower most pod is collected to a collecting pan, and wherein the collecting pan is operatively connected to the pre-growing chamber such that the nutrient solution collected in the collecting pan can be fed further into the pre-growing chamber.

3. The hydroponic plant grow cabinet according to claim 2, characterized in that the nutrient solution fed into the pre-growing chamber is collected onto a solution pan below the holder module for receiving several seed/seedling growing cups, where a level of the solution in the solution pan is kept such that at least the bottom part of each seed/seedling growing cup is immersed into the nutrient solution and excess solution is fed into the main tank.

4. The hydroponic plant grow cabinet according to claim 1, characterized in that the controller is set to send through the network communication device status and alarm messages to a user's communication device.

5. The hydroponic plant grow cabinet according to claim 1, wherein the first, second and third refill cartridges are disposed in the cartridge refill module and wherein the first refill cartridge comprises the nutrient solution, the second refill cartridge comprises a first chemical for regulating pH level down and the third refill cartridge comprises a second chemical for regulating pH level up.

* * * * *